(12) United States Patent
Martin

(10) Patent No.: US 11,891,809 B1
(45) Date of Patent: Feb. 6, 2024

(54) METHOD FOR INSTALLING METAL ROOF AND FLOOR DECK TO A STRUCTURAL STEEL FRAME

(71) Applicant: New Rule Products, Inc., St. Charles, MO (US)

(72) Inventor: Gerald D. Martin, St. Charles, MO (US)

(73) Assignee: New Rule Products, Inc., St. Charles, MO (US)

( * ) Notice: Subject to any disclaimer, the term of this patent is extended or adjusted under 35 U.S.C. 154(b) by 557 days.

(21) Appl. No.: 17/213,406

(22) Filed: Mar. 26, 2021

Related U.S. Application Data

(60) Provisional application No. 63/000,003, filed on Mar. 26, 2020.

(51) Int. Cl.
*E04D 15/04* (2006.01)
*E04D 3/30* (2006.01)
*B62B 3/10* (2006.01)
*B62B 3/00* (2006.01)
*E04B 5/32* (2006.01)

(52) U.S. Cl.
CPC .............. *E04D 15/04* (2013.01); *B62B 3/008* (2013.01); *B62B 3/108* (2013.01); *E04D 3/30* (2013.01); *E04B 5/32* (2013.01); *E04B 2103/06* (2013.01)

(58) Field of Classification Search
CPC ......... B62B 3/008; B62B 3/108; E04D 15/04; E04D 3/30; E04D 2103/06

USPC .......................................................... 118/305
See application file for complete search history.

(56) References Cited

U.S. PATENT DOCUMENTS

| | | | | |
|---|---|---|---|---|
| 3,983,676 A | * | 10/1976 | Gilpin | E04D 15/04 |
| | | | | 52/749.12 |
| 4,600,118 A | | 7/1986 | Martin | |
| 5,704,815 A | | 1/1998 | Shibata et al. | |
| 5,865,341 A | | 2/1999 | Martin | |
| 6,216,416 B1 | * | 4/2001 | West | E04G 3/26 |
| | | | | 52/749.12 |
| 7,451,893 B2 | | 11/2008 | Martin | |
| 8,342,545 B2 | * | 1/2013 | Mayo | E04D 15/04 |
| | | | | 280/79.7 |
| 8,505,772 B2 | | 8/2013 | Martin | |
| 8,507,824 B2 | | 8/2013 | Martin | |
| 9,630,270 B2 | | 4/2017 | Martin | |

* cited by examiner

*Primary Examiner* — Andrew J Triggs
(74) *Attorney, Agent, or Firm* — Grace J. Fishel

(57) ABSTRACT

An ergonomic method for transporting and installing a sheet of metal decking in a composite floor or roof structure having underlying I-beams. A carrier with a flat top surface is loaded with the next sheet of decking to be installed in the next open position on the beams. The carrier has an inclined surface and upon reaching the next open position the next sheet of decking is rested on the inclined surface with lifting hooks. An ironworker pushes the next sheet of decking down the inclined surface towards the next open position and working the ends of the next sheet of decking with ribs and flat sections therebetween into alignment with the I-beams with lifting hooks which engage the ribs while standing on the previously laid deck.

19 Claims, 19 Drawing Sheets

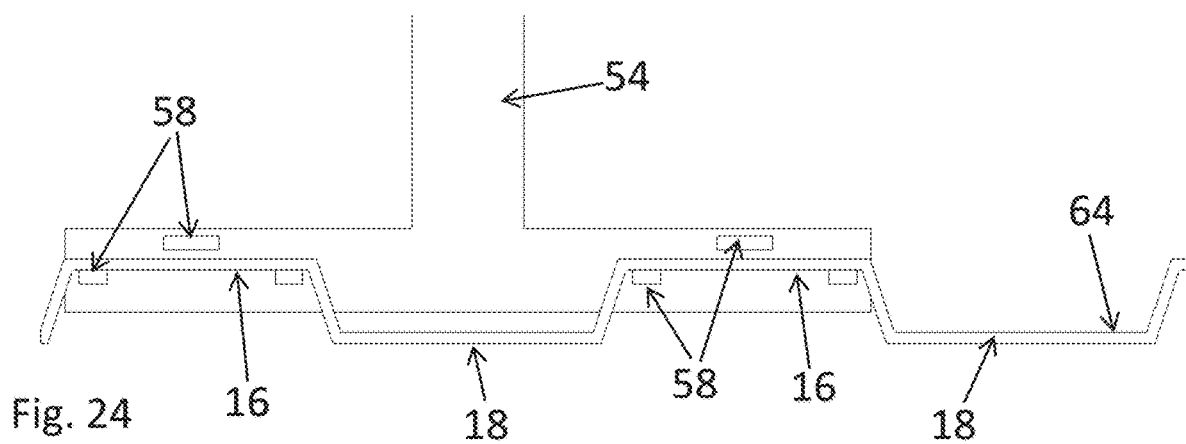

METHOD FOR INSTALLING METAL ROOF AND FLOOR DECK TO A STRUCTURAL STEEL FRAME

BACKGROUND OF THE INVENTION

Field of the Invention

The present invention relates to metal decking and the way ironworkers presently install roof and floor deck on the structural steel by hand without aide from ergonomically designed tools.

Brief Description of the Prior Art

General Concerns with Traditional Composite Construction

When designing our nation's infrastructure utilizing steel construction design, structural engineers typically call out corrugated metal deck to be used as a concrete form to span the steel beams so that concrete may be poured on top of the deck to create a floor and or roof for the structure.

Approximately one third of the steel erection package is needed to set the steel frame. Another one third is required to plumb the steel and bolt everything securely. The final one third is the time and labor it takes to lay the metal deck and secure it to the horizontal steel members.

Once the steel is set, plumbed and bolted securely, bundles of deck are set at one end of each bay. These bundles have the exact amount of deck to be distributed over the steel beams or joist for that bay.

The horizontal steel members on average could have an 8" wide flange and be 30' long and have a minimum of 6' to 8' of open air between one parallel beam or joist and the next.

Depending on the design of the structure, the sheets of deck could have a thickness from roughly 22 gauge up to 16 gauge thick and could be either 24" to 36" wide and be up to 30' long. The weight of each piece could be up to 300 plus pounds. A 16-gauge×36"×30' piece of deck weighs 311 pounds. 20-gauge×24"×30' weighs 124 pounds.

All jobs require at least one worker on each end of the pile of deck. Longer lengths, heavier weights or both may require two workers on each end to pick up, carry and then place the deck.

The workers must stand on the bare beams facing each other, pick up a sheet of deck and then walk sideways across the 5" wide highs of the previously installed deck while also not trying to step into the 7" wide lows and trip and then step out onto the open beams and set the piece of deck down.

The job of laying deck could be the most dangerous job for an ironworker to accomplish out of all of their many tasks and as far as I know there is no other method available currently, other than by hand, described above.

BRIEF SUMMARY OF THE INVENTION

In view of the above, it is an object of the present invention to provide the following ergonomic, efficiency, safety and quality assurance benefits to help lower the in-place cost of steel erection:

A first carrier for transporting decking into place for use separately or in combination with flattening and fasteneing device as described in U.S. application Ser. No. 17/188,612, filed Mar. 1, 2021, which is incorporated by reference herein.

A new method and ergonomic method for a carrier to ergonomically carry the deck at a safe level for the workers across the corrugated metal deck that has previously been placed into position on the beams to form a concrete form for the floor or roof.

The carrier employs a set of strategically placed rollers of various types and configurations to navigate the highs and lows of corrugated metal deck while flattening it.

The carrier provides new method and ergonomic method for an inclined, ramp type structure, attached to the carrier to allow the deck to slide down to the next available work area on the open beams.

The carrier has a stop to help transition the deck from the inclined surface or ramp to its workplace on the steel beams.

A new ergonomic method for a set of extended hooks to help control the deck from the top of the carrier, down the ramp, transitioning to the work area and final adjustment into place allowing the workers to work from an ergonomically sound position.

A second quadrilateral carrier that allows sheets of deck to be transported across previously laid deck with deck with hooks and when rolled with a vertex facing forward more effectively spreads the load on the previously the previously laid deck.

BRIEF DESCRIPTION OF THE SEVERAL VIEWS OF THE DRAWINGS

In the accompanying drawings, where several of various embodiments of the invention are illustrated, in which.

Figure 1:
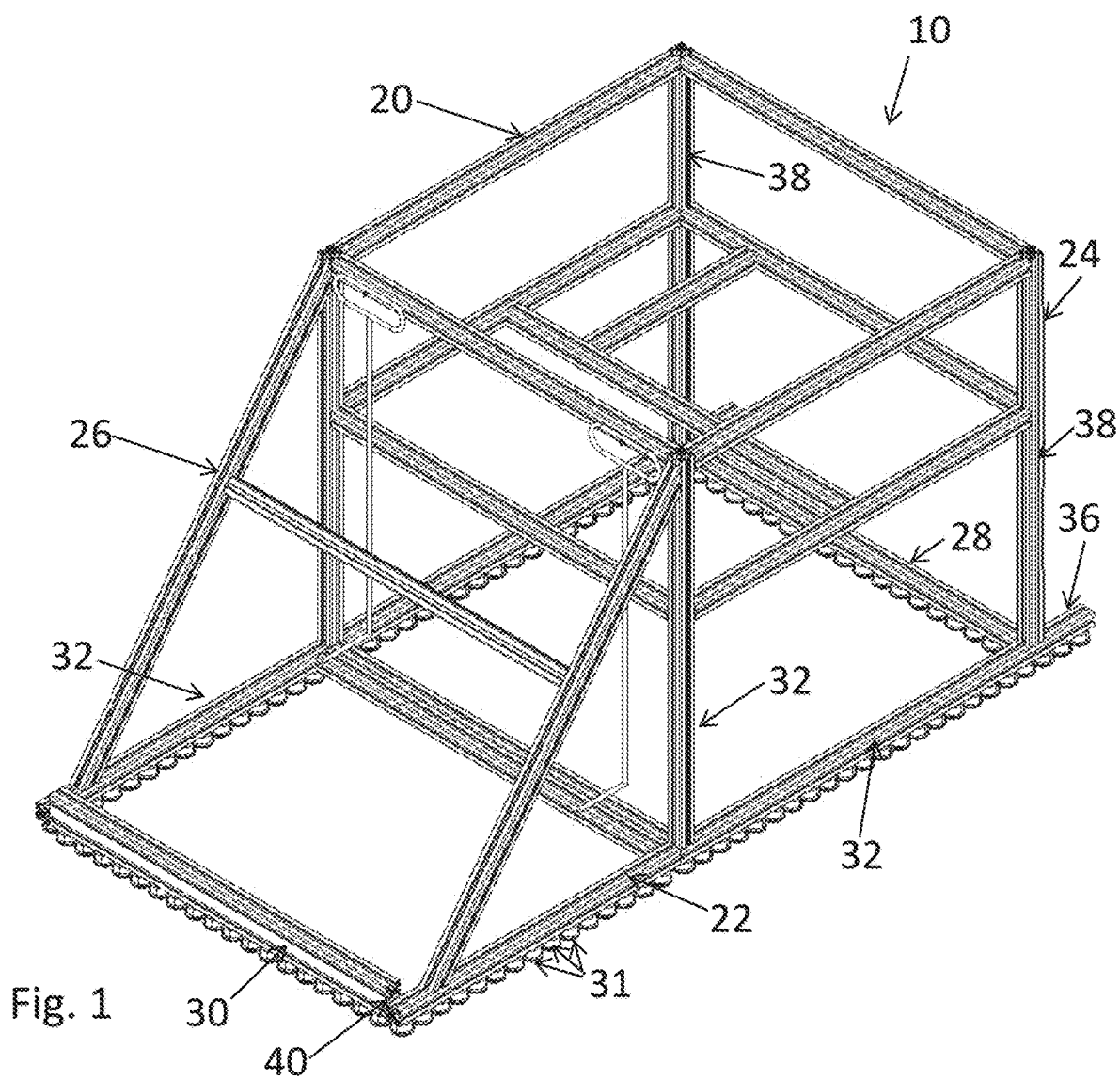
FIG. 1 is a perspective view of a first carrier in accordance with the present invention with a rectilinear structure.
Figure 2:
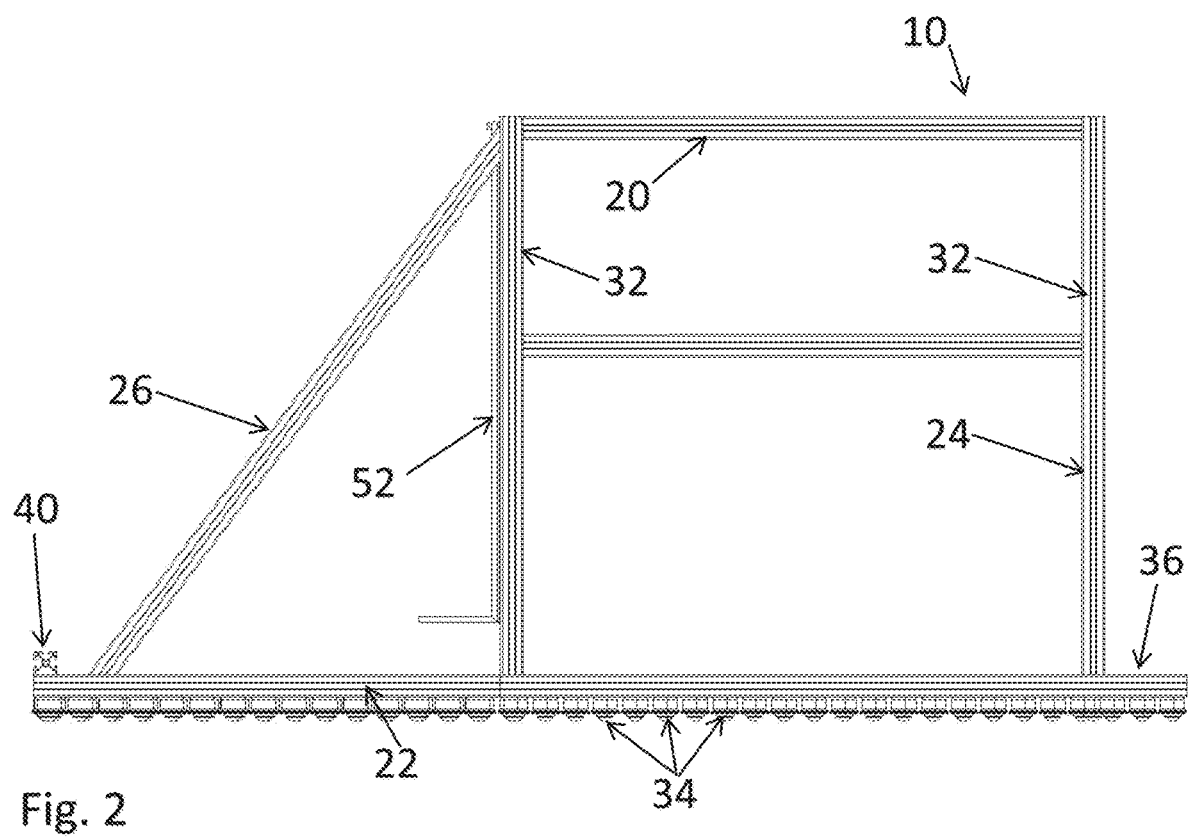
FIG. 2 is a side view of the first carrier.
Figure 3:
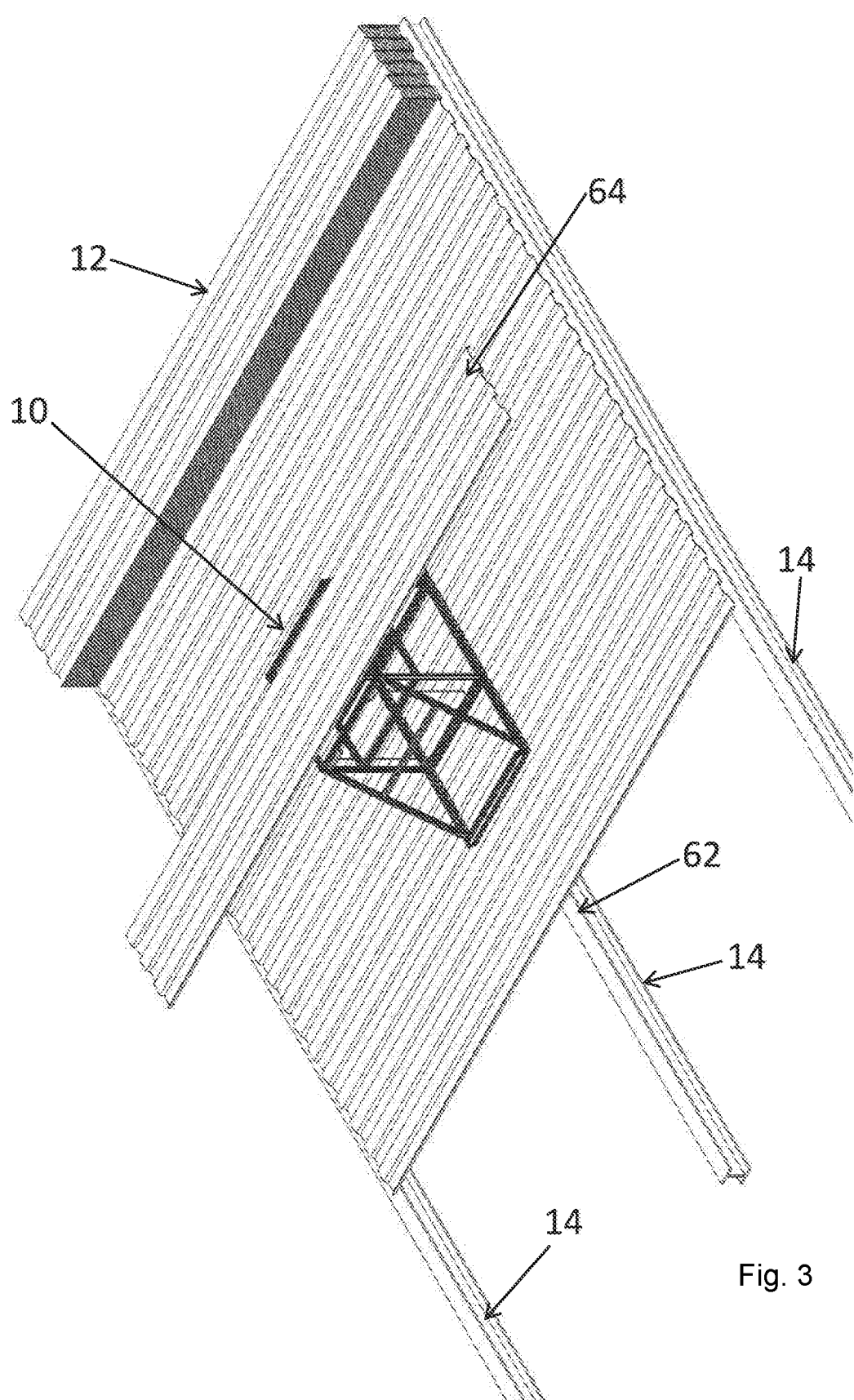
FIG. 3 is a perspective view of the first carrier carrying a sheet of decking across a previously laid deck.
Figure 4:
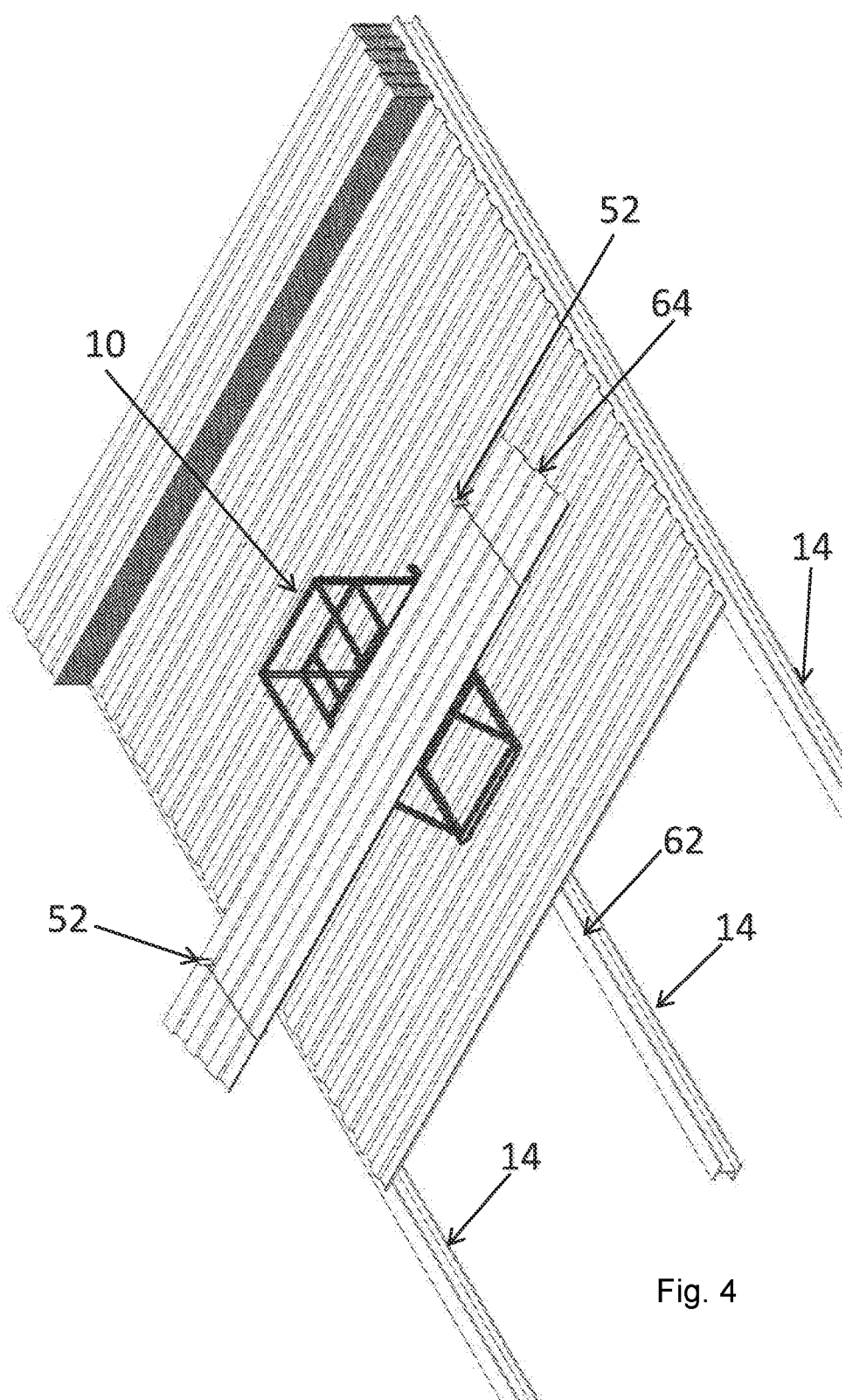
FIG. 4 is a perspective view of the first carrier with first and second lifting hooks moving the sheet of decking down an inclined surface of the carrier.
Figure 5:
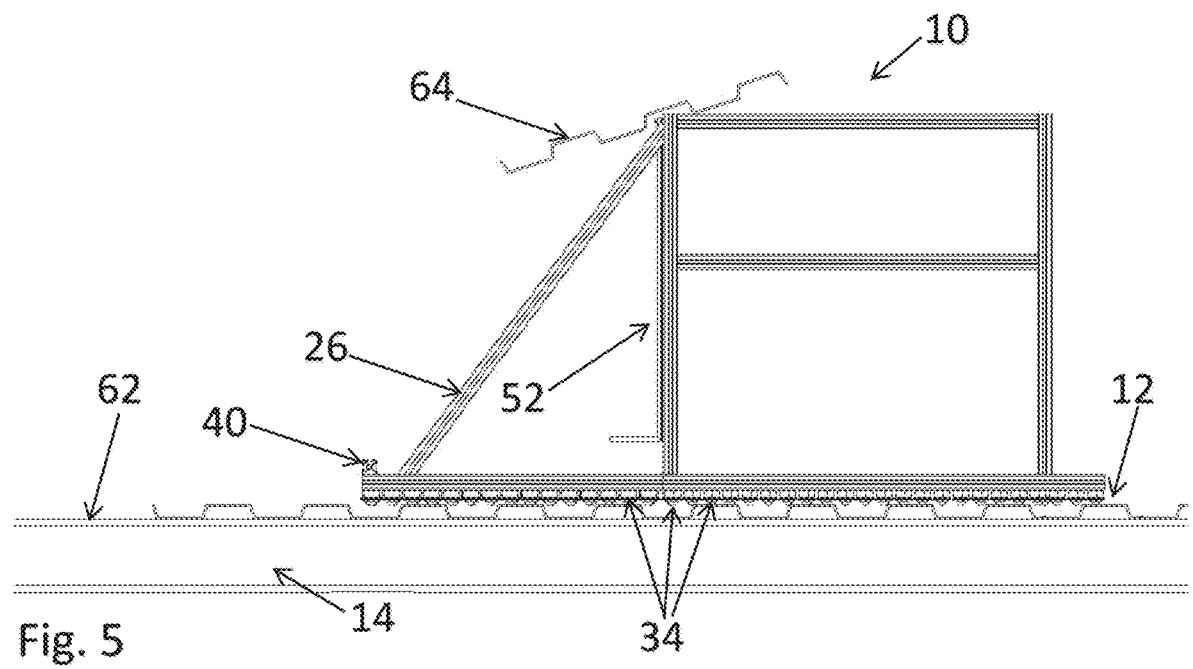
FIG. 5 is a side view of the first carrier showing the sheet of decking transitioning from loaded on the flat upper surface to the inclined surface of the carrier.
Figure 6:
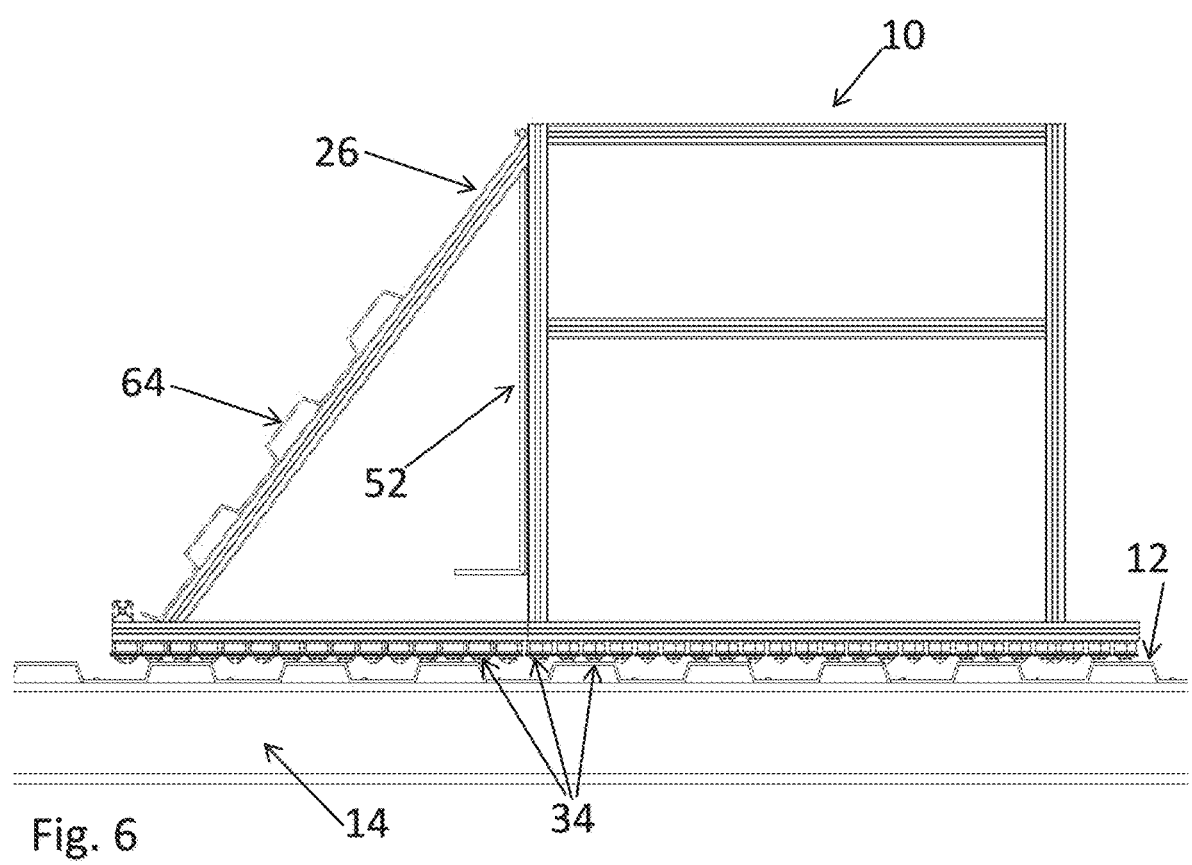
FIG. 6 is a side view of the first carrier showing the sheet of decking resting against a stop on the inclined surface.
Figure 7:
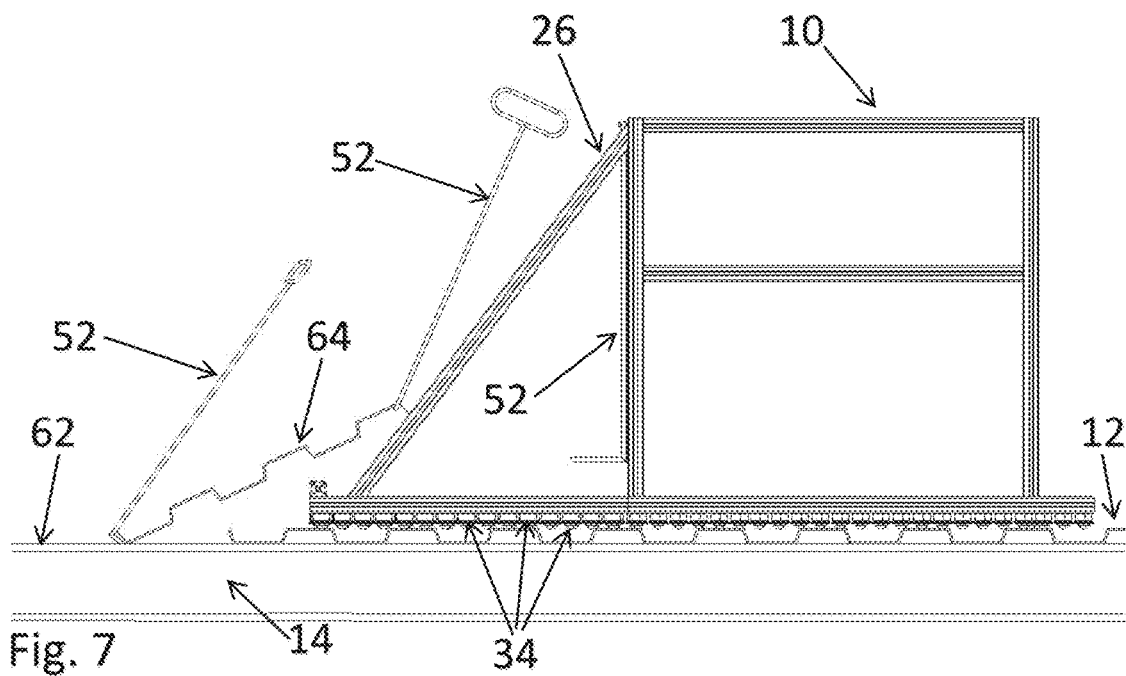
FIG. 7 is a side view of the first carrier shown with first and second lifting hooks moving the sheet of decking towards the area where the next sheet of decking will be laid.
Figure 8:
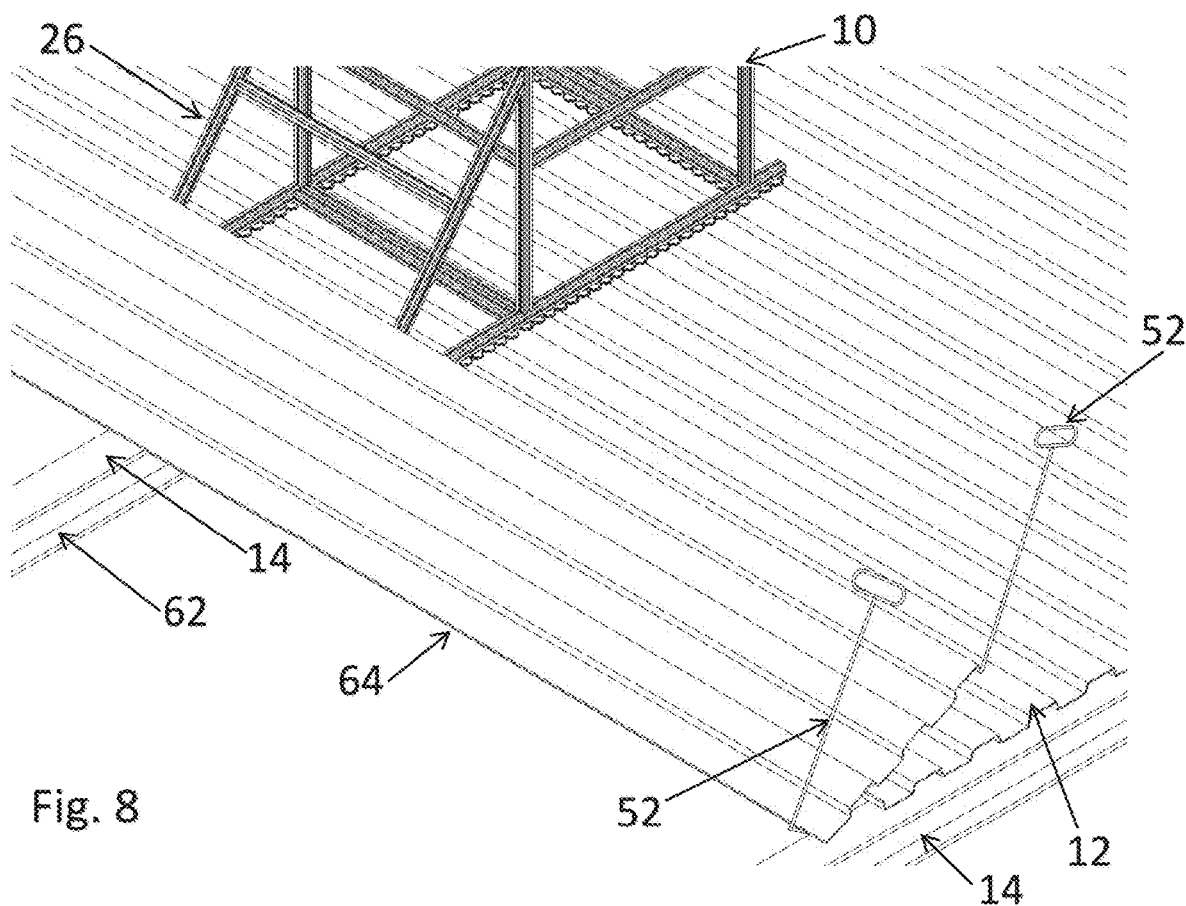
FIG. 8 is a perspective view of a pair of lifting hooks received in the ribs of the decking for placing the decking in the area where the next sheet of decking is laid.
Figure 9:
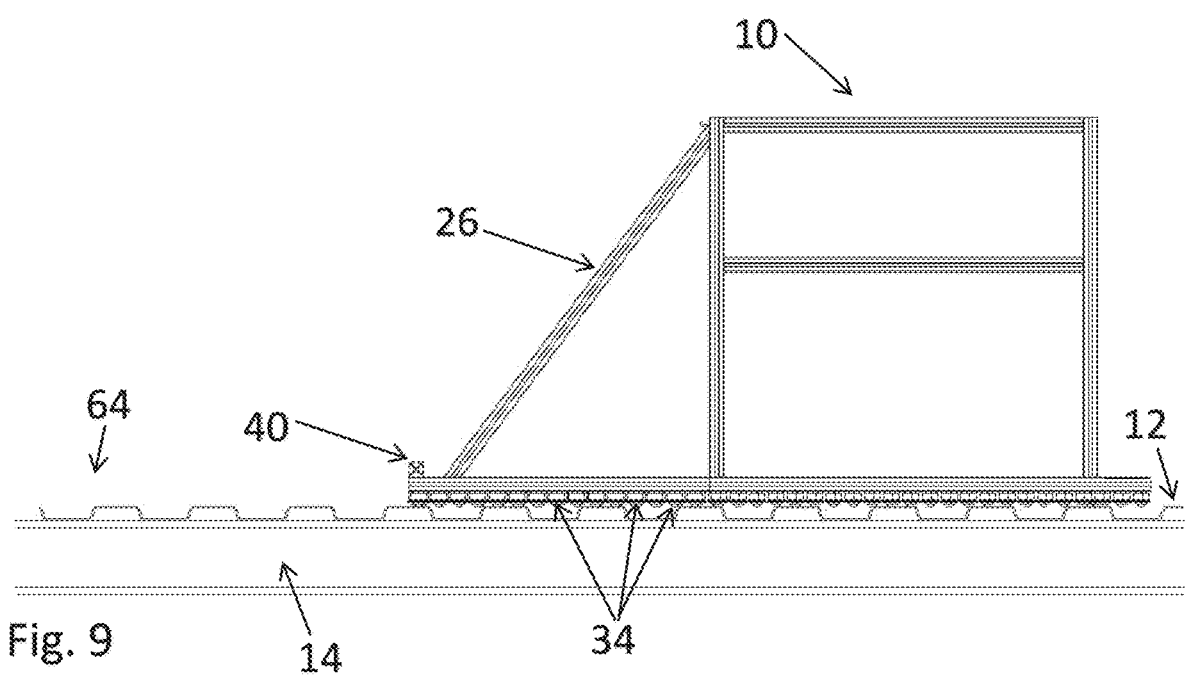
FIG. 9 is a side view of the first carrier with the next sheet of decking laid.
Figure 10:
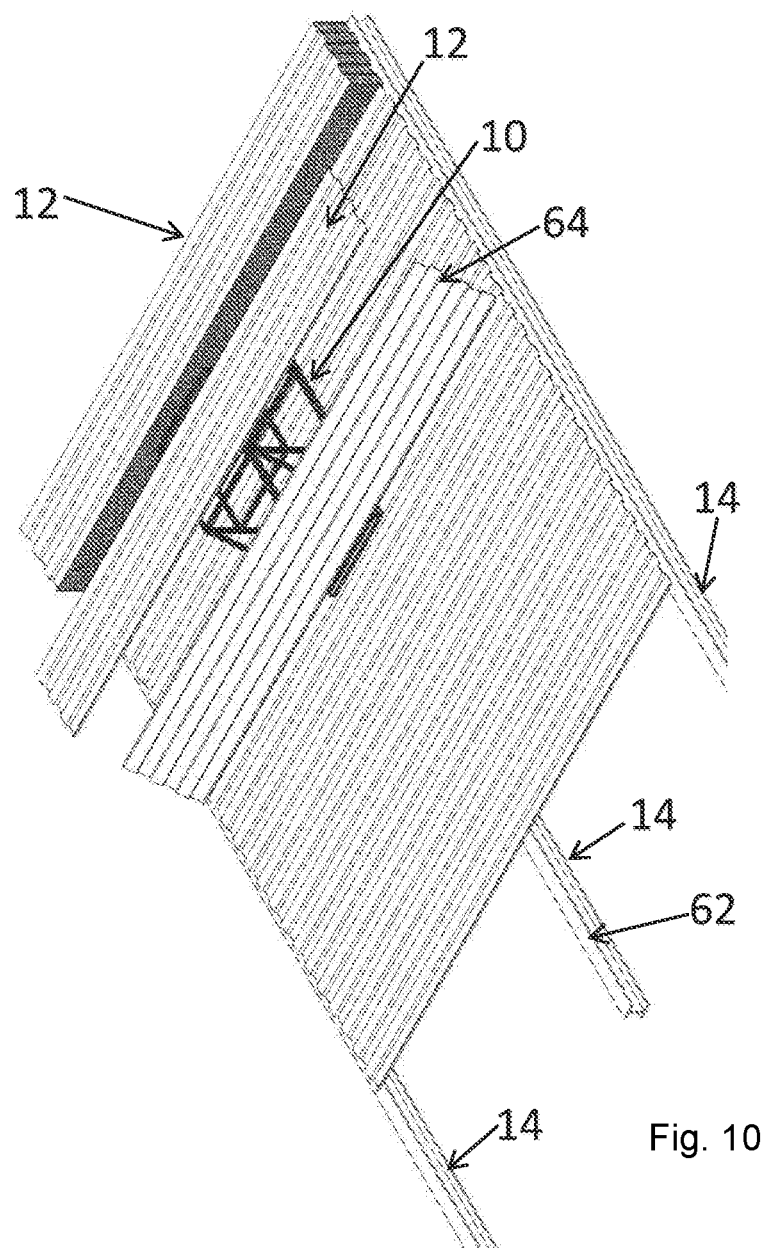
FIG. 10 is a perspective view of the first carrier with a plurality of decking stack on the flat top frame and the next sheet of decking resting against a stop on the inclined surface.
Figure 11:
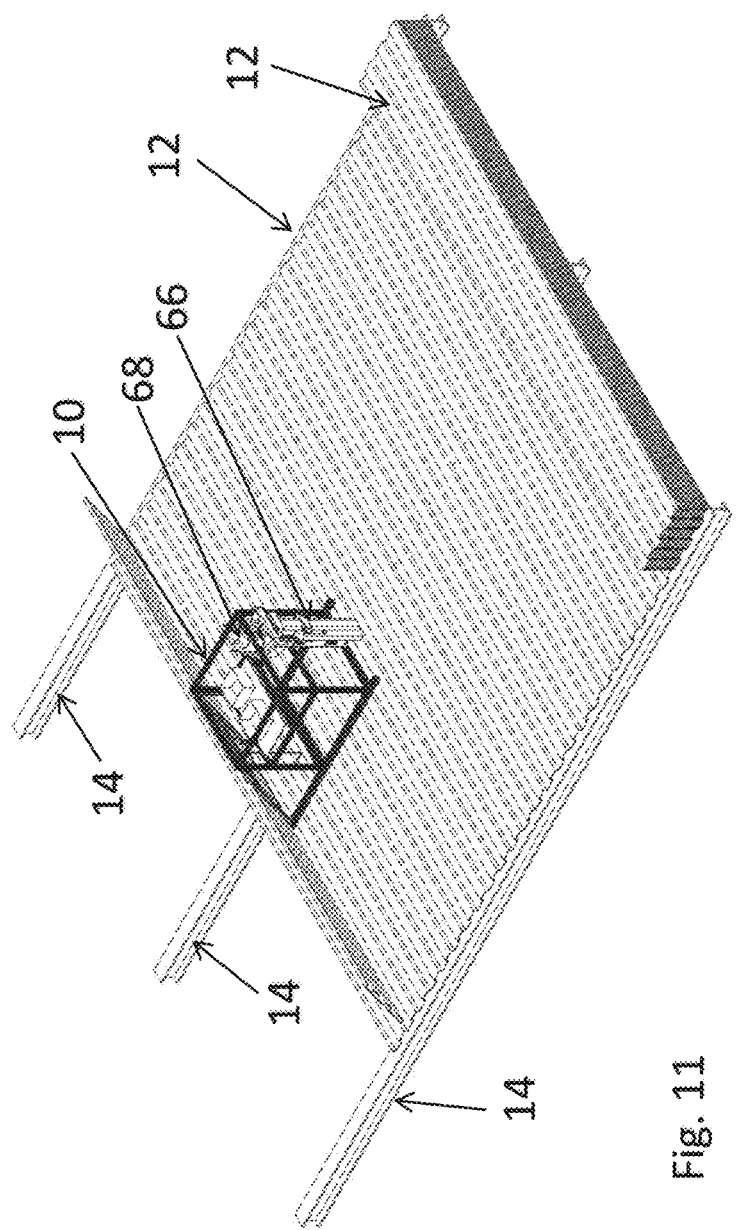
FIG. 11 is a perspective view of the first carrier moving across a previously laid deck with a fastener tool and fastener depth analyzer mounted on the carrier.
Figure 12:
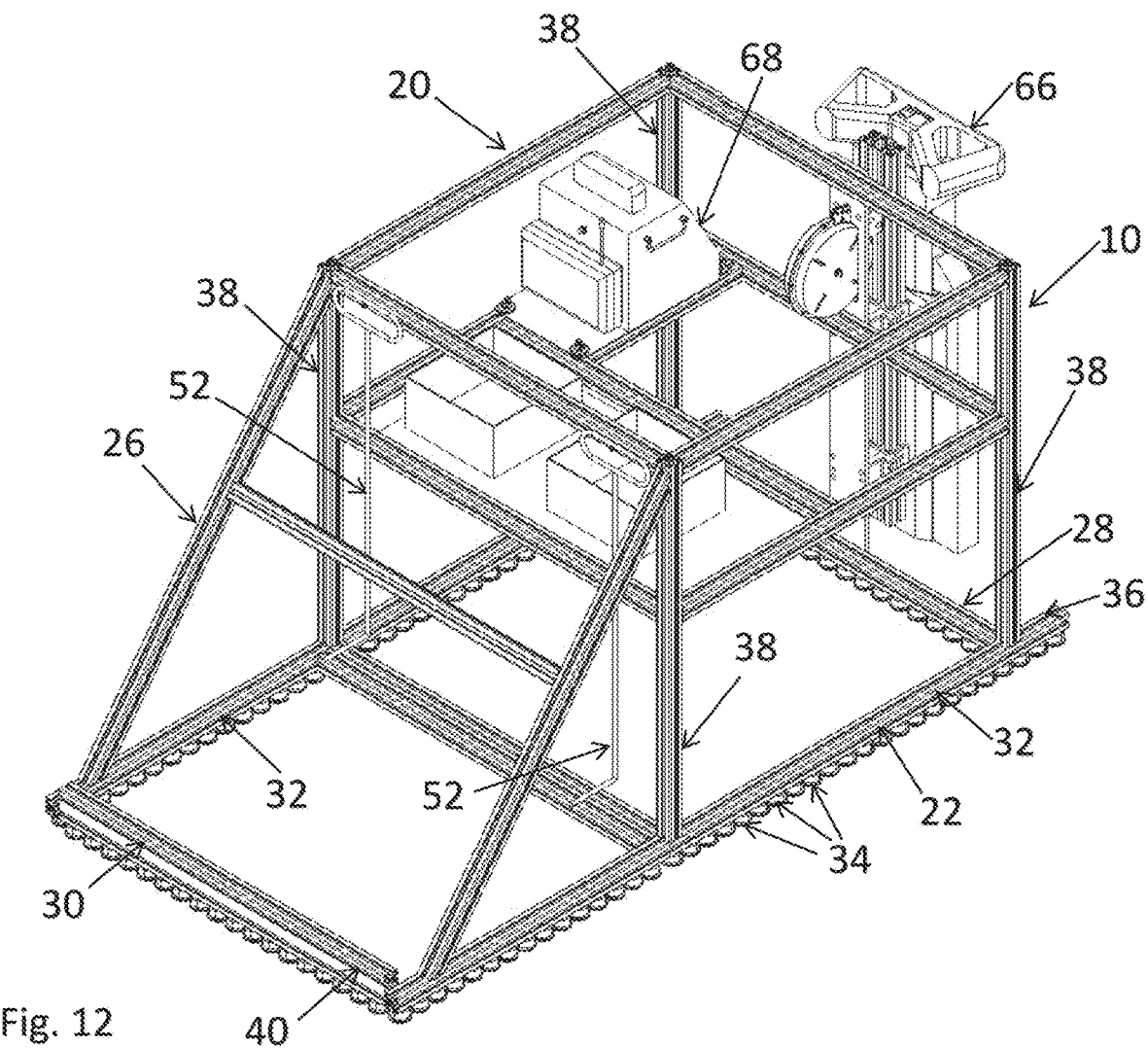
FIG. 12 is a perspective view of the first carrier with the fastener tool and fastener depth analyzed mounted on the carrier.
Figure 13:
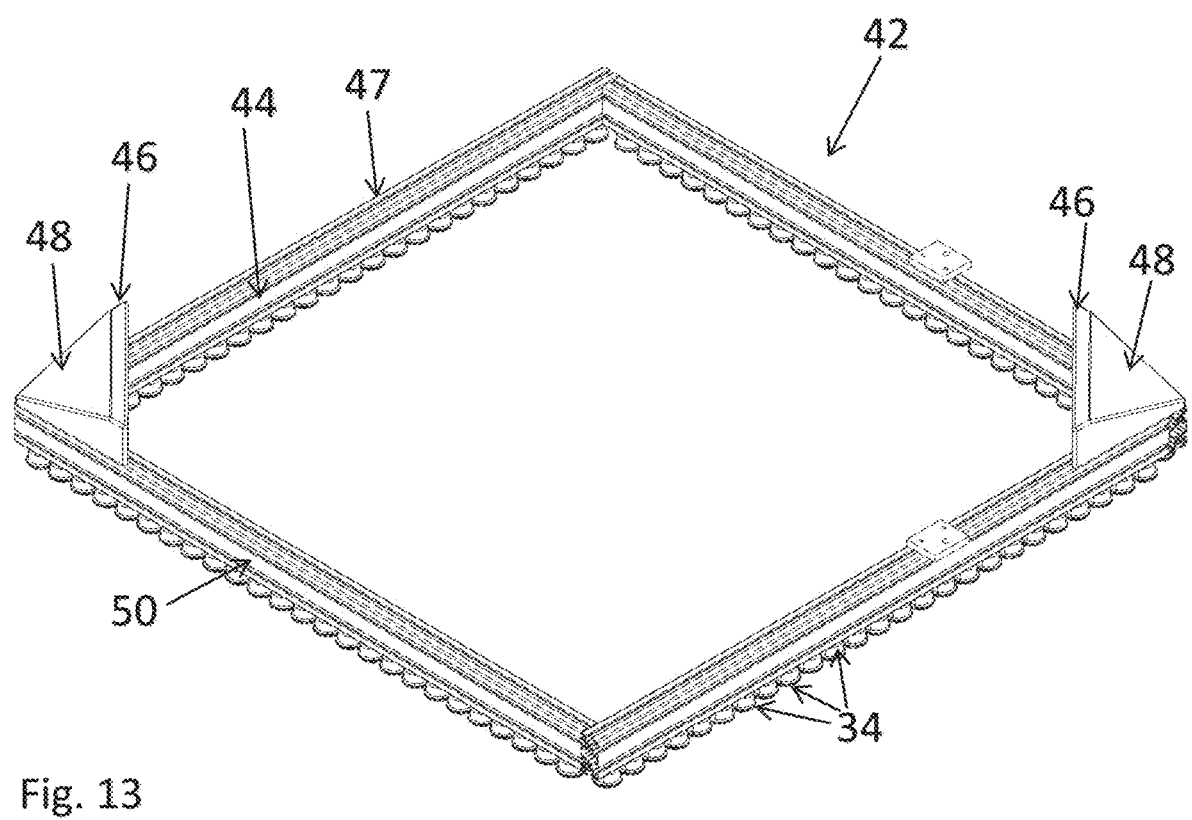
FIG. 13 is a perspective view of a second carrier in accordance with the present invention with a square configuration.
Figure 14:
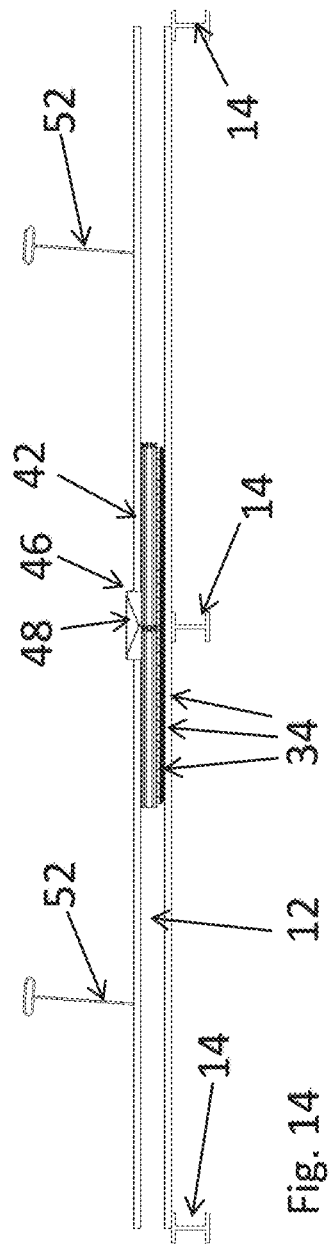
FIG. 14 is a front elevation of the second carrier with a triangular shoulder on a vertex facing toward the area where the next sheet of decking will be laid.
Figure 15:
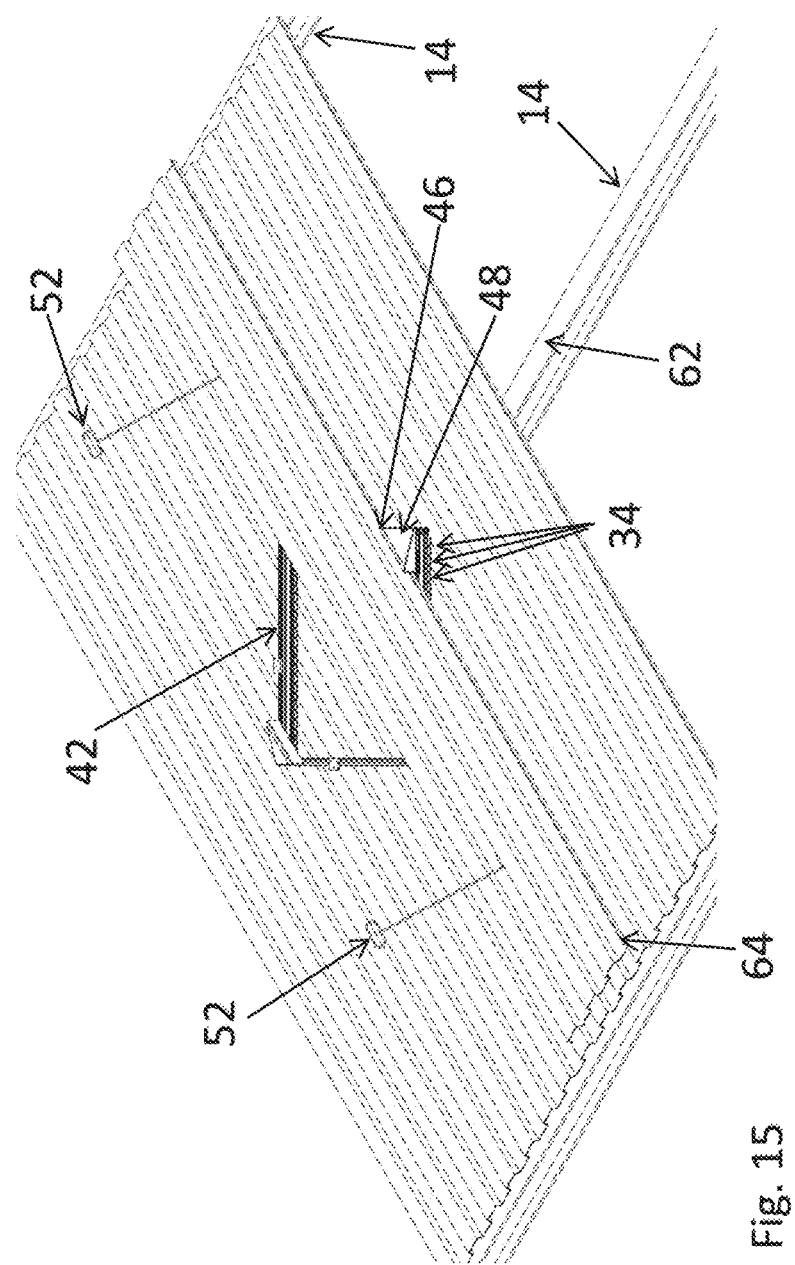
FIG. 15 is a perspective of the second carrier with a pair of lifting hooks preparing to lift the sheet of decking on the triangular shoulder facing the area where the next sheet of decking will be laid.
Figure 16:
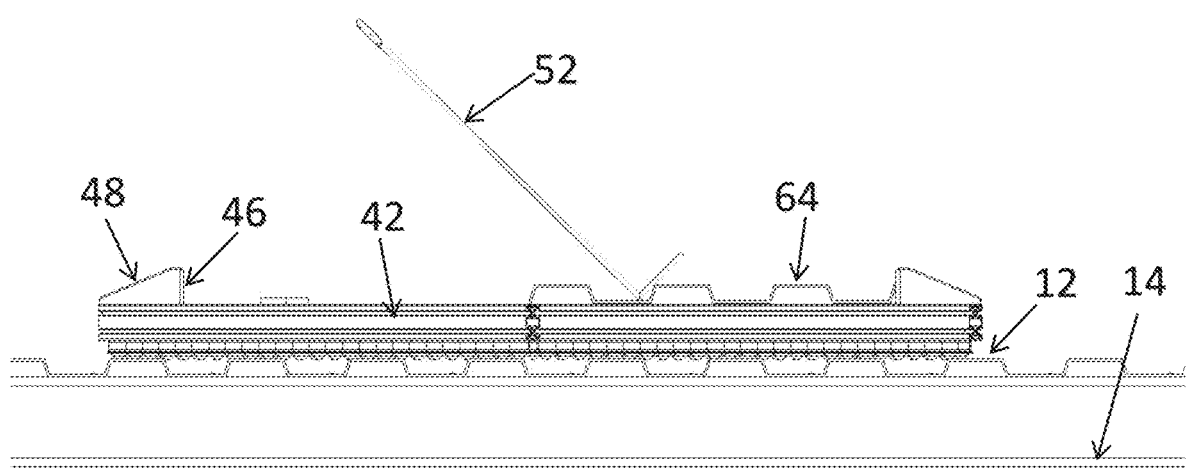
FIG. 16 is a side elevation of the second carrier with one of the lifting hooks pushing the next sheet of decking against the triangular shoulder facing the area where the next sheet of decking will be laid.
Figure 17:
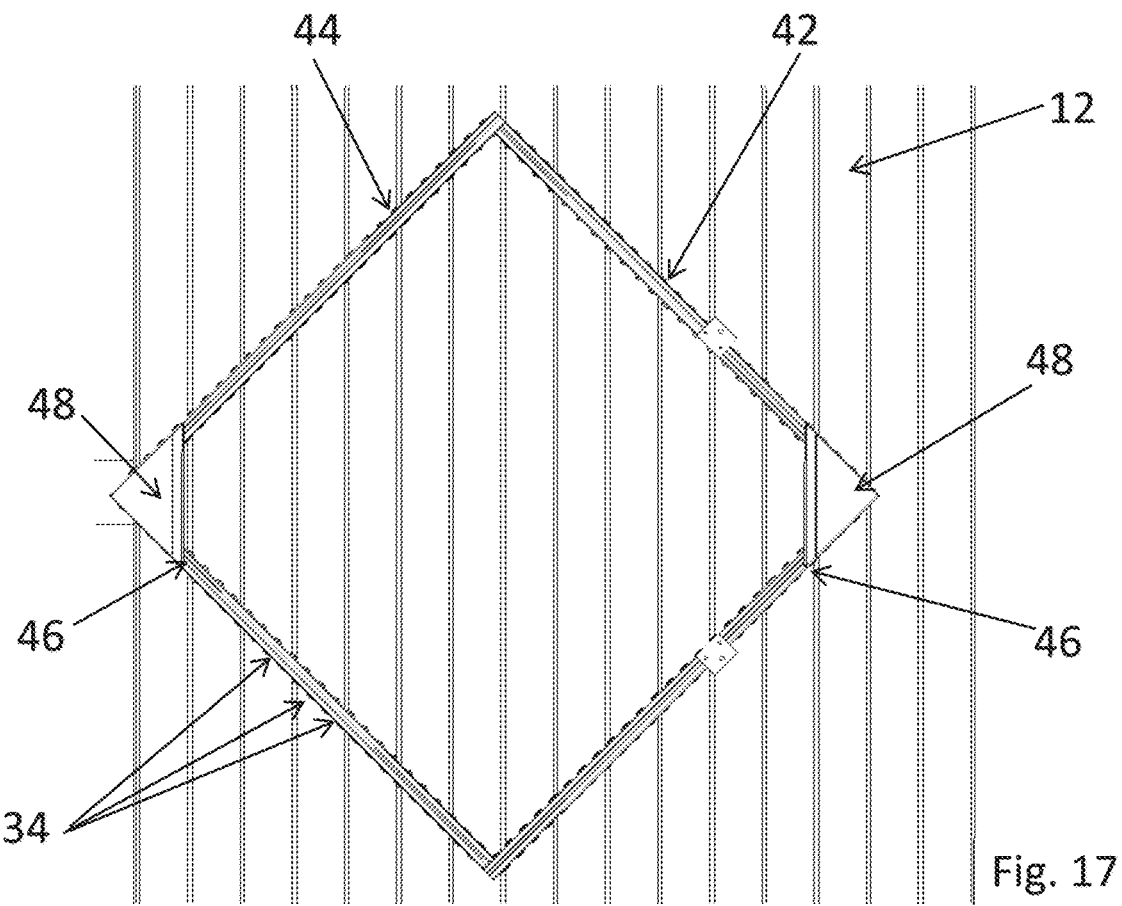
FIG. 17 is a plan view of the second carrier in accordance with the present invention facing the area where the next sheet of decking may be laid illustrating the number of ribs in contact with the rollers.
Figure 18:
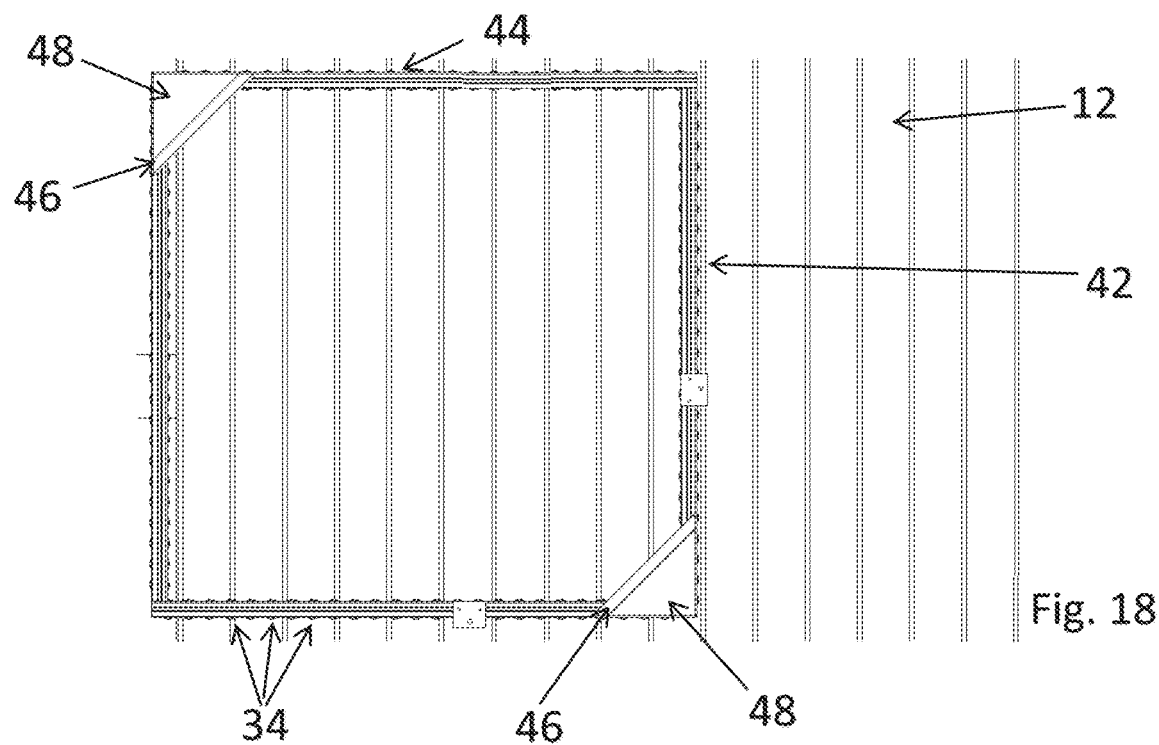
FIG. 18 is a plan view of the second carrier positioned not in accordance with present invention.
Figure 19:
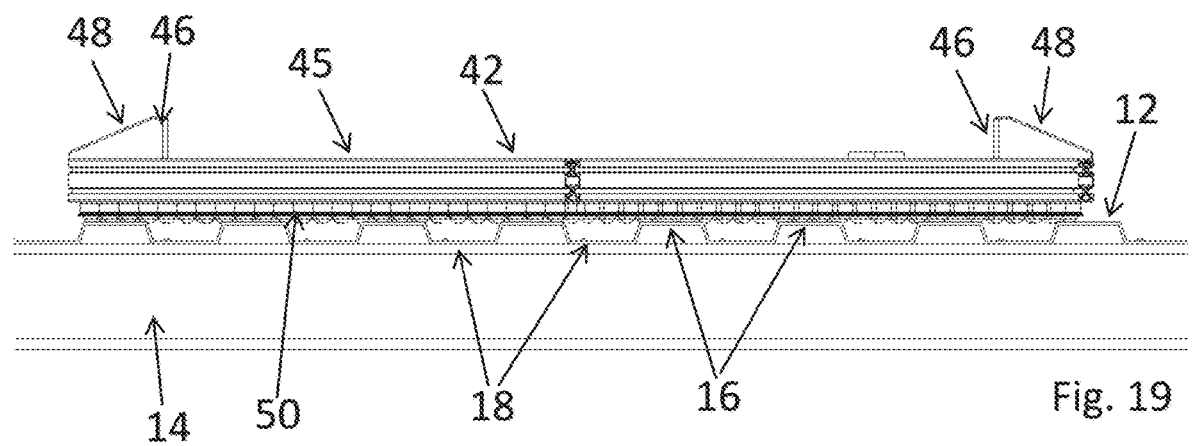
FIG. 19 is a side view of the second carrier shown in FIG. 17 showing the number of rollers in contact with 7.4 ribs of the previously laid deck.

DETAILED DESCRIPTION OF AT LEAST ONE PREFERRED EMBODIMENT OF THE INVENTION AND REFERENCING THE INSTALLING TRADITIONAL COMPOSITE FLOOR AND ROOF DECK FILED HEREWITH

Referring to the drawings more particularly by reference character, a first carrier 10 is shown in FIGS. 1-12 for use in an ergonomic method for transporting and installing sheets of metal decking 12 in a composite floor or roof structure having underlying I-beams 14. As shown, the decking 12 has a plurality of longitudinally oriented hollow ribs 16 disposed in generally parallel spaced relation with a flat panel section 18 disposed between adjacent ribs. Decking 12 is provided in different widths, typically 24" or 35", and diffident lengths, typically 20' or 30', but the present method may be used with decking having other widths and lengths.

First carrier 10 as shown in the drawings is a rectilinear structure with a flat top frame 20, a flat bottom frame 22 and a front frame 24. An inclined surface 26 opposed to front frame 24 is attached to top frame 20 and bottom frame 22. Bottom frame 22 has a front and rear transverse member 28, 30, respectively, joined to lateral side members 32. Front transverse member 28 is positioned inside outboard ends of lateral side members 32. A plurality of spaced apart ball rollers 34 are positioned on an underside of front and rear transverse members 28, 30 and lateral side members 32 with the outboard ends of the lateral members forming outriggers 36. Front frame 24 and inclined surface 26 are joined to top and bottom frames 20, 22, respectively with vertical side members 38. In an embodiment, bottom frame 22 is 5" above the previously laid deck and inclined surface 26 has a stop 40 on a lower end. Top frame 20 is above the previously laid deck and measures 40" by 40".

A second carrier 42 for use in the ergonomic method for transporting and installing sheets of decking 12 is shown in FIGS. 13-20. As shown in drawings second carrier 42 has a quadrilateral frame 44 illustrated as square with a flat surface on an upper side 44 and opposing triangular shoulders 46 on opposing vertices. Each of shoulders 46 has a downwardly inclined surface 48. A plurality of spaced apart ball rollers 34 are positioned on an underside 50 of the square frame. While frame 44 is illustrated as square other quadrilaterals such as a rectangle, kite, rhombus, parallelogram or trapezoid are possible.

Figure 21:
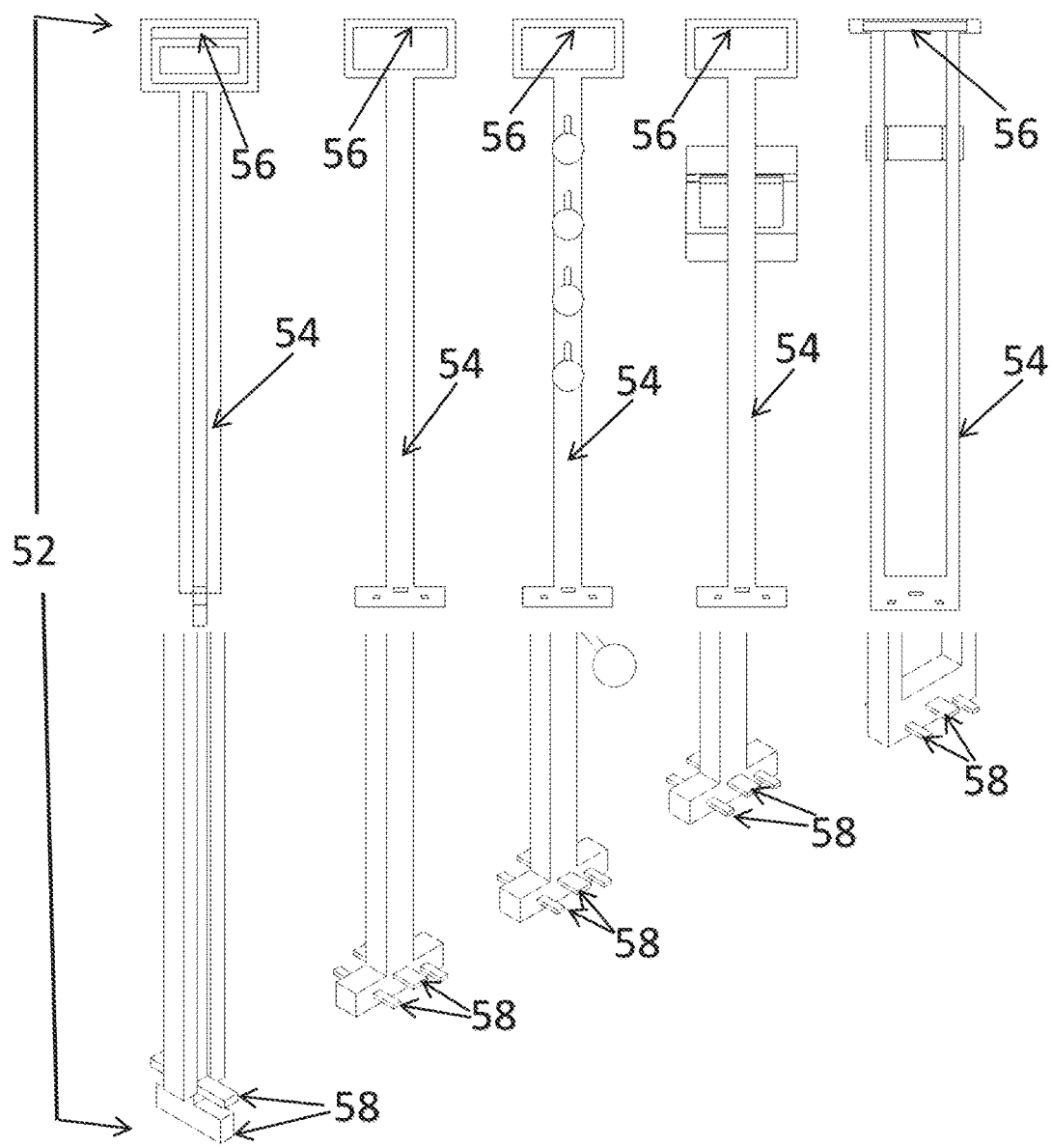
FIG. 21 is a perspective view of a different lifting hooks for use in manipulating the sheets of decking.
Figure 22:
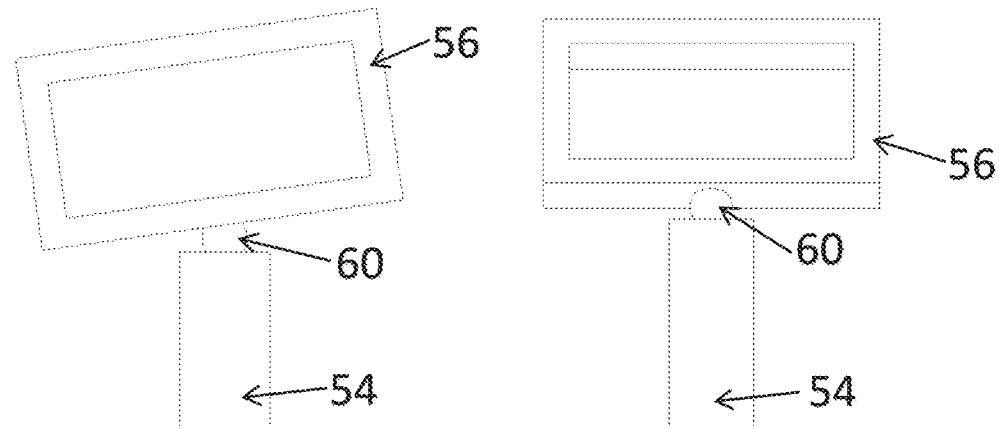
FIG. 22 is a schematic view showing a handle pivoted to the elongated rigid body of a lifting hook.
Figure 23:
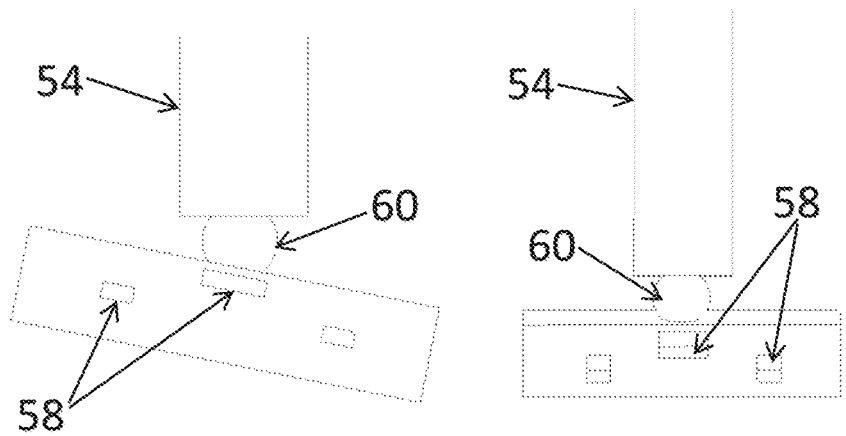
FIG. 23 is a schematic view showing teeth of the lifting hook pivoted to the elongated rigid body; and, FIG. 24 is a side view showing upper and lower teeth of the lifting hook straddling the upper and lower surfaces of the ribs of the metal decking.

A plurality of different lifting hooks 52 are shown in FIGS. 21-24, each of which includes an elongated rigid body 54 with a handle 56 at a first end and at least one tooth 58 on a second end. As shown in FIG. 21, elongated rigid body 54 may be adjustable in length and hook 52 has an at least one upper tooth 58 and at least one lower tooth 58. The spacing between the upper and lower teeth 58 may also be adjustable. Upper and lower teeth 58 may be used to grip rib 16 as shown in FIG. 24. Other hooks 52 with different style handles 56 are shown in FIG. 21. Turning to FIG. 22, handle 56 may be pivotable at 60 on elongated rigid body 54 or as shown in FIG. 23 hook 52 may be pivotable at 60 on elongated rigid body 54 thus facilitating manipulation of the decking 12.

First carrier 10 is designed so that workers may place one or more sheet of metal decking on flat top frame 20 at an ergonomically favorable height and allow the worker to walk in an ergonomically favorable upright position and push carrier 10 with as little as one finger across the pre-laid metal deck to the next open position 62 for another piece of deck to be installed or laid. Movement of carrier 10 across the previously laid deck is perpendicular to the laid deck ribs 16 and parallel to beams 14. Carrier 10 eliminates the need for one or more workers to hand carry awkward sheets of heavy decking across the ribs 16 and flat panel sections 18 of the prelaid deck.

Figure 20:
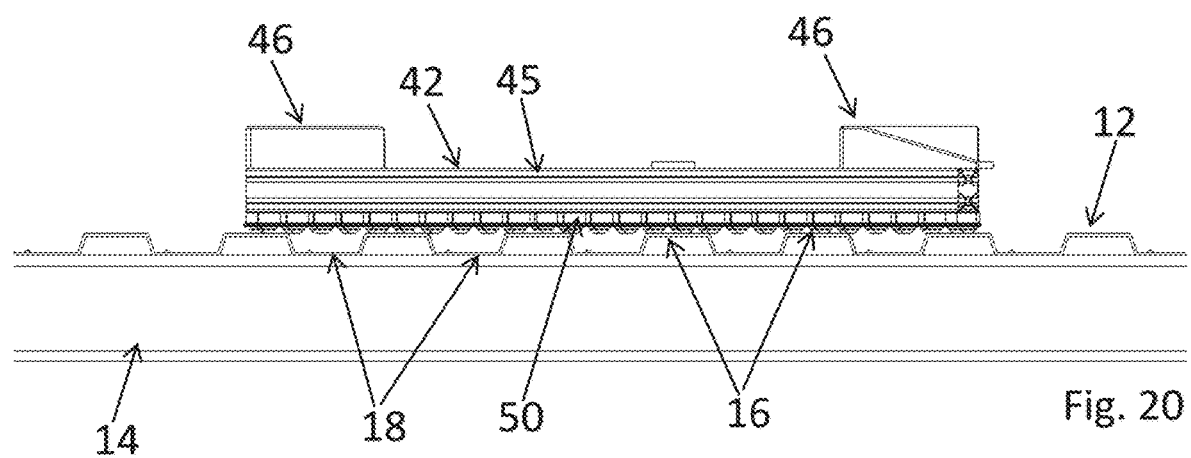
FIG. 20 is a side view of the second carrier shown in FIG. 18 showing that the number of rollers in contact with 5.4 ribs of the previously laid deck.

As shown in FIGS. 3-7, inclined surface 26 on carrier 10 allows workers to transfer the next sheet of decking 64 to be installed from flat top frame 20 to a close proximity of the next open position 62 on beams 14 without sliding out of control. Stop 40 at the bottom of inclined surface 26 keeps the decking from sliding out of control and allows the decking to rest in position on the inclined surface 26. The ironworkers can then let go of the decking, examiner the work area for installation and then adjust the decking on the inclined surface 26 with lifting hooks 52 for installation. As shown in FIG. 20, teeth 58 of lifting hook 52 are received between the upper and lower surface of ribs 16 such that next sheet of decking 64 may be aligned with the underlying I-beams. With long pieces of metal decking 12 two more carriers 10 may work in concert.

In FIGS. 13-20, second carrier 42 is shown transporting a metal decking towards the area where the next sheet of decking 64 will be installed. Carrier 42 is pushed with one of the opposing triangular shoulders 46 facing forward until reaching next open position 62 where the next sheet of decking will be laid on the underlying I-beams. In a manner like first carrier 10, next sheet of metal decking 64 is moved with lift hook 52 onto downwardly inclined surface 48 which directs the decking into place on the I-beams. The advantage of this movement of carrier 42 with a vertex facing forward is illustrated in FIGS. 17-20. For example when underside 50 of carrier 42 measures 51.5" by 51.5", the floor diagonal is 72.833". If the prelaid deck has a pattern repeat of 9.875", the number of ball rollers 34 contacting ribs 16 is 7.4 when the carrier is diagonal to beams 14 but only 5.2 when the carrier is parallel to beams 14. The load on carrier 42 is thus best distributed when a vertex faces forward. Another advantage is that if the carrier in FIG. 18 accidentally extends over the leading edge of the prelaid deck by 3", 25% of the carrier is hanging over the edge whereas with the carrier in FIG. 17 only 5% of the carrier is suspended, a much safer condition.

While carriers 10 and 42 are illustrated with an open bottom, in other embodiments, bottom frame 22 of carrier 10 and underside 50 of carrier 50 may formed as a plate with rollers in a central portion as well as about the periphery.

In the field, the ergonomic method of the present invention works as follows: A crew of two workers will be able to install most composite floor and roof decks. The workers will lay the first two to four pieces of the deck onto the bare beams in the usual manner. They will then place carrier 10 or carrier 42 on the recently set deck and load top frame 20 one or more sheets of decking 12. The worker will then push the carrier across the previously laid deck until they come next open position 62 where next sheet of decking 64 is to be laid.

The workers will then place next sheet of decking 64 on inclined surface 26 of carrier 10 or inclined surface 48 of carrier 42. The workers can then adjust the decking right to left on inclined surface with lifting hooks 52 to be sure that the decking is in position to install onto the bare beams. They will then lift next sheet of decking 64 with the lifting hooks 52 into position on the bare beams while standing on the previously installed deck. Once the next sheet of decking 64 is installed, the workers may then move forward if another sheet of decking 12 is on carrier 10 or carrier 42 and the process is repeated. Lifting hooks 52 allow the workers to lay the deck ergonomically while standing upright.

A fastening tool 66 and analyzer 68 may be attached to carrier 10 before decking 12 is loaded on the carrier. Carrier 10 weighted with fastening tool 66 and analyzer 68 flattens the decking against the underlying beams. The workers may then fasten the flattened deck on the I-beams with fastening tool 66 and confirm proper placement with analyzer 68.

In view of the above, it will be seen that the several objects of the invention are achieved and other advantageous results attained. As various changes could be the method and the equipment used therein without departing from the scope the invention it is intended that all matter contained in the above description or shown in the accompanying drawings shall be interpreted as illustrative and not in a limiting sense.

What is claimed:

1. An ergonomic method for transporting and installing sheets of metal decking in a composite floor or roof structure having underlying I-beams, said method comprising:
    loading a next sheet of metal decking on a carrier with a plurality of spaced apart ball rollers on an underside, a flat surface on an upper side for supporting the next sheet of metal decking and an inclined surface on a forward side, said next sheet of metal decking having a plurality of longitudinally oriented hollow ribs disposed in generally parallel spaced relationship with a flat panel section disposed between adjacent ribs;
    pushing the carrier across a previously laid deck until reaching an area where the next sheet of metal decking will be laid on the underlying I-beams; said spaced apart ball rollers on the underside of the carrier arranged such at any instant of time a number of the roller wheels are in contact with a plurality of the ribs while the other rollers remain free from entering into the flat panel sections;
    placing the next sheet of metal decking on the inclined surface with first and second lifting hooks working from opposite sides of the carrier; and,
    continuing to work from the previously laid deck while sliding the next sheet of metal decking down the inclined surface into place in the area where the next sheet of metal decking will be laid with the first and second lifting hooks in engagement with the ribs of the metal decking.

2. The ergonomic method of claim 1 wherein the carrier comprises a rectilinear structure with a flat top frame, a flat bottom frame and a front frame, said inclined surface opposed to the front frame and attached to the top frame and the bottom frame, said bottom frame has front and rear transverse members joined to lateral side members, said front transverse member positioned inside outboard ends of the lateral side members, a plurality of spaced apart ball rollers positioned on an underside of the front and rear transverse members and lateral members, said outboard ends with rollers forming an outrigger, said front frame and said inclined surface joined to the top and bottom frame with vertical side members.

3. The ergonomic method of claim 2 wherein a plurality of metal decking is stacked on the flat top frame, said next sheet of metal decking being topmost, said metal decking being 24" or 36" wide and 8' to 20' long.

4. The ergonomic method of claim 2 wherein said metal decking is between 24" and 36" wide and 20 to 40' long and the metal decking is supported by at least two carriers, each of which has a flat top frame measuring 40" by 40".

5. The ergonomic method of claim 2 wherein the bottom frame is about 5" above the previously laid deck and the inclined surface has a stop on a lower end, said top frame being 40" above the previously laid deck.

6. The ergonomic method of claim 1 wherein the lifting hooks have an elongated rigid body with a handle at a first end and at least one tooth on a second end configured for receipt in the ribs of the metal decking.

7. The ergonomic method of claim 6 wherein a length of elongated rigid body is adjustable.

8. The ergonomic method of claim 6 wherein the handle, the tooth or both the handle and the tooth are rotatable with respect to the elongated rigid body.

9. The ergonomic method of claim 1 wherein the lifting hooks have upper and lower teeth configured to grip the ribs of the metal decking.

10. The ergonomic method of claim 9 wherein spacing between the upper and lower teeth is adjustable.

11. An ergonomic method for transporting and installing sheets of metal decking in a composite floor or roof structure having underlying I-beams, said method comprising:
    loading a next sheet of metal decking on a quadrilateral carrier with a plurality of spaced apart ball rollers on an underside, a flat surface on an upper side for supporting the next sheet of metal decking and opposing triangular shoulders on opposing vertices, each opposing triangular shoulder having a downwardly inclined surface, said next sheet of metal decking having a plurality of longitudinally oriented hollow ribs disposed in generally parallel spaced relationship with a flat panel section disposed between adjacent ribs;
    pushing the carrier across a previously laid deck with one of the opposing triangular shoulders facing forward until reaching an area where the next sheet of metal decking will be laid on the underlying I-beams; said spaced apart ball rollers on the underside of the carrier arranged such at any instant of time a number of the roller wheels are in contact with a plurality of the ribs while the other rollers remain free from entering into the flat panel sections;

placing the next sheet of metal decking on the inclined surface of the one of the opposing triangular shoulders facing forward with first and second lifting hooks working from opposite sides of the carrier; and, continuing to work from the previously laid deck while sliding the next sheet of metal decking down the inclined surface into place in the area where the next sheet of metal decking will be laid with the first and second lifting hooks in engagement with the ribs of the metal decking.

12. The ergonomic method of claim 11 wherein the quadrilateral carrier is square.

13. The ergonomic method of claim 11 wherein a plurality of metal decking is stacked on the flat surface on the upper side of the carrier, said next sheet of metal decking being topmost, said metal decking being 24" or 36" wide and 8' to 20' long.

14. The ergonomic method of claim 11 wherein said metal decking is between 24" and 36" wide and 20 to 40' long and the metal decking is supported by at least two carriers, each of which has a flat surface on the upper side measuring 40" by 40".

15. The ergonomic method of claim 11 wherein the lifting hooks have an elongated rigid body with a handle at a first end and at least one tooth on a second end configured for receipt in the ribs of the metal decking.

16. The ergonomic method of claim 15 wherein a length of elongated rigid body is adjustable.

17. The ergonomic method of claim 15 wherein the handle, the tooth or both the handle and the tooth are rotatable with respect to the elongated rigid body.

18. The ergonomic method of claim 11 wherein the lifting hooks have upper and lower teeth configured to grip the ribs of the metal decking.

19. The ergonomic method of claim 18 wherein spacing between the upper and lower teeth is adjustable.

* * * * *